US006676316B2

(12) United States Patent
Mindler et al.

(10) Patent No.: US 6,676,316 B2
(45) Date of Patent: Jan. 13, 2004

(54) MEDIA CASSETTE HAVING AN IDENTIFICATION DEVICE FOR IDENTIFYING THE TYPE OF MEDIA IN THE CASSETTE, AND AN IMAGING APPARATUS HAVING SAID MEDIA CASSETTE

(75) Inventors: Robert F. Mindler, Churchville, NY (US); Robert C. Cohoon, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 72 days.

(21) Appl. No.: 09/941,215

(22) Filed: Aug. 28, 2001

(65) Prior Publication Data

US 2003/0044210 A1 Mar. 6, 2003

(51) Int. Cl.[7] .......... G01D 18/00

(52) U.S. Cl. .......... 400/624; 400/706.1; 400/707.1; 271/3.15; 271/9.01; 116/307

(58) Field of Search .......... 400/624, 706, 400/706.1, 707.2, 703; 116/306, 307; 271/3.15, 9.01, 9.02

(56) References Cited

U.S. PATENT DOCUMENTS

| | | | | | |
|---|---|---|---|---|---|
| 4,617,580 | A | | 10/1986 | Miyakawa | |
| 5,130,757 | A | * | 7/1992 | Ito | 399/14 |
| 5,305,020 | A | * | 4/1994 | Gibbons et al. | 347/177 |
| 5,305,706 | A | * | 4/1994 | Arjomand | 116/234 |
| 5,552,758 | A | * | 9/1996 | Tobin | 340/323 R |
| 5,607,078 | A | * | 3/1997 | Nordberg et al. | 220/756 |
| 5,925,889 | A | | 7/1999 | Guillory et al. | |
| 6,000,871 | A | * | 12/1999 | Fisher, Sr. | 400/706 |
| 6,028,320 | A | | 2/2000 | Uhling | |
| 6,079,807 | A | | 6/2000 | Lindstrom et al. | |
| 6,099,178 | A | | 8/2000 | Spurr et al. | |
| 6,106,166 | A | | 8/2000 | Spurr et al. | |
| 6,192,141 | B1 | | 2/2001 | Ahn | |

* cited by examiner

*Primary Examiner*—Andrew H. Hirshfeld
*Assistant Examiner*—Dave A. Ghatt
(74) *Attorney, Agent, or Firm*—David A. Novais

(57) ABSTRACT

A media cassette adapted to hold multiple media types and an imaging apparatus which includes the media cassette. The media cassette includes a device for identifying the type of media loaded in the cassette to permit an adjustment of printer electronics based on the identified media in the cassette. The cassette comprises a cover that includes a section that is adapted to identify a a type of media. The identifying section can include a reflective surface or label which cooperates with a sensor in the imaging apparatus to detect and/or not detect light that is reflected back to the sensor. This signal is then used by the imaging apparatus to identify the type of media in the cassette, and adjust imaging operations based on the type of media in the cassette.

22 Claims, 7 Drawing Sheets

FIG. 6A
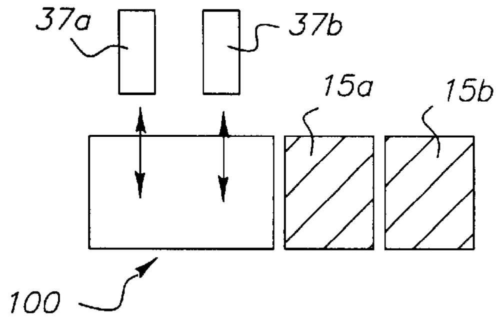
FIG. 6B
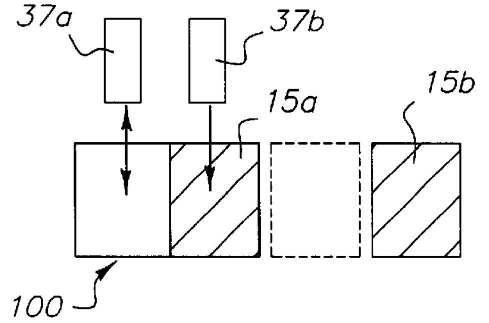
FIG. 6C
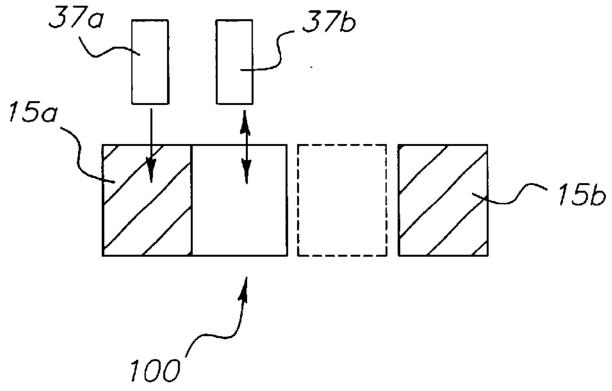
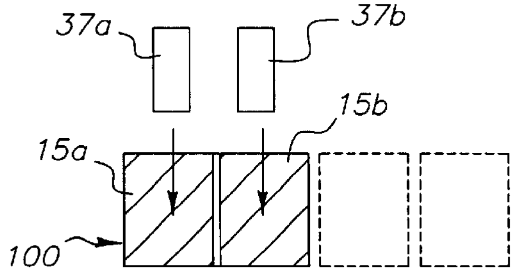
FIG. 6D

MEDIA CASSETTE HAVING AN IDENTIFICATION DEVICE FOR IDENTIFYING THE TYPE OF MEDIA IN THE CASSETTE, AND AN IMAGING APPARATUS HAVING SAID MEDIA CASSETTE

FIELD OF THE INVENTION

The present invention relates to a media cassette and an imaging apparatus having the media cassette. More particularly, the present invention relates to a system and method which identifies the media type in a cassette designed to hold multiple media types and communicates the type of media to the imaging apparatus.

BACKGROUND OF THE INVENTION

In an imaging apparatus such as a thermal printer which can image multiple types of media, it is advantageous that the printer recognize the type of media that is in the cassette so as to optimize the printing operation based on the type of media. If the proper type of media is not recognized by the printer, then you may have a receiver type mismatch, and the printer would not be optimized to the specific type of media. In conventional imaging arrangements which are capable of receiving multiple types of media, a different tray is utilized for each type of media. This increases the amount of parts and also makes it difficult and time consuming when changing from one media type to another. More specifically, in conventional arrangements, for each type of media, a receiver tray and/or label that is unique to the receiver type is required to be used.

SUMMARY OF THE INVENTION

The present invention provides for a system and method that permits the identification of multiple receiver or media types which are held in a single receiver tray of an imaging apparatus such as a thermal printer. The system and method of the present invention uses a sensor arrangement which, for example, can be a reflective sensor package that has an emitter and detector mounted in the imaging apparatus, in combination with a receiver tray that has an attached reflective surface or label indicative of a media type. The system and method of the present invention also utilizes a movable member such as a slidable cover or plate that slides or moves in a first direction over the reflective surface or label to block the reflective surface or label, or slides or moves in a second direction to expose the reflective surface or label. This permits the sensor package of the imaging apparatus to differentiate between media types. When exposed, the reflective surface or label will reflect back the emitted signal to the detector in the sensor package indicating to the printer that it is one type media. When the movable member covers the reflective surface or label, the emitted signal will be blocked, and thus a signal will not be sent back to the detector. This indicates a different media type to the printer.

The present invention accordingly relates to a media cassette that is adapted to hold multiple media types. The media cassette comprises a media tray adapted to hold media to be fed to an imaging apparatus; a media type identification member provided on the media tray, with the media type identification member including a first section that identifies that a first type media is in the tray, and a second section that identifies that a second type of media is in the tray; and a movable member provided on the media type identification member. The movable member has an opening and is movable between a first position in which the opening is aligned with the first section to identify that the first type media is in the tray, and a second position in which the opening is not aligned with the second section to identify that the second type of media is in the tray.

The present invention further relates to a media cassette that is adapted to hold multiple media types to be fed to an imaging apparatus. The media cassette comprises a cover provided on the cassette, with the cover comprising a first section that is adapted to identify that a first media type is in the cassette, and a second section that is adapted to identify that a media type other than the first media type is in the cassette; and a movable member movably provided on the cover and having an opening. The movable member is movable between a first position in which the opening exposes the first section to indicate that imaging will be performed on the first type of media, and a second position which blocks the first section to indicate that imaging will be performed on the media type other than the first media type.

The present invention further relates to an imaging apparatus that comprises a removable media cassette that is adapted to hold multiple media types for imaging in the imaging apparatus, with the media cassette comprising a media type identification member adapted to provide a first type of information to the imaging apparatus when a first type of media is in the media cassette, and provide a second type of information to the imaging apparatus when media other than the first media type is in the media cassette; and an imaging apparatus control assembly which adjusts an operation of the imaging apparatus based on the first or second type of information.

The present invention further relates to an imaging arrangement that comprises a removable media cassette that is adapted to hold multiple media types for imaging in the imaging apparatus, with the media cassette comprising a cover having a reflective section to indicate that a first type of media is in the cassette, and the media cassette further comprising a movable member provided on the cover and having an opening. The movable member is movable between a first position in which the opening is aligned with the reflective section to indicate that the first type of media is in the media cassette, and a second position in which the opening is not aligned with the reflective section to indicate that a second type of media is in the cassette. The imaging arrangement further comprises a media type sensor that includes a light emitter and a light detector, with the light detector detecting emitted light from the light emitter which reflects back from the reflective section of the cover when the movable member is in the first position and provides a first signal indicative thereof; and an imaging arrangement controller operationally associated with the media type sensor. The imaging arrangement controller receives the first signal from the media type sensor when the movable member is in the first position to adjust an operation of the imaging arrangement based on the first type of media in the cassette, and receives a further signal from the media type sensor when the movable member is in the second position to adjust an operation of the imaging arrangement based on the second type of media in the cassette.

The present invention further relates to an imaging apparatus that comprises: a media cassette adapted to hold multiple types of media therein, with the cassette comprising a reflective section which identifies that a first media type is in the cassette; a sensor having a light emitter that emits light to the media cassette and a light detector that detects light that is reflected back to the sensor, and a movable member provided on the media cassette. The movable member is movable between a first position in which the reflective section is exposed so as to reflect the light emitted from the light emitter back to the light detector to indicate that the first type of media is in the cassette, and a second position in which the reflective section is blocked so that no light is reflected back to the light detector to indicate that a second type of media is in the cassette. The sensor is adapted to provide a signal to the imaging apparatus indicative of the type of media in the cassette based on whether light is reflected or not reflected from the cassette.

The present invention further relates to a method of identifying a media type that is in a media cassette which comprises the steps of providing a cover on the media cassette that includes a first section that identifies that a first type of media is in the cassette and a second section that identifies that a second type of media is in the cassette; providing a movable member having an opening on the cover; and moving the movable member to a first position in which the opening is aligned with the first section when the first type of media is in the cassette, and to a second position in which the opening is not aligned with the first section when the second type of media is in the cassette.

The present invention further relates to a method of indicating a type of media and communicating the type of media to an imaging apparatus which comprises the steps of: providing a cover having a reflective surface thereon on a media cassette; providing a movable member having an opening on the cover; moving the movable member to one of a first position in which the opening is aligned with the reflective surface when a first type of media is in the cassette, and a second position in which the opening is not aligned with the reflective surface when a second type of media is in the cassette; inserting the media cassette having media therein into the imaging apparatus; and emitting a light toward the media cassette, such that when the first type of media is in the cassette, the movable member is placed in the first position to cause the emitted light to be reflected from the reflective surface back to a light detector operationally associated with the imaging apparatus to indicate to the imaging apparatus that the first type of media is in the cassette, and the movable member is placed in the second position to block the reflective surface from the emitted light and prevent the reflected light from going back to the light detector to indicate to the imaging apparatus that the second type of media is in the cassette.

The present invention further relates to a media cassette adapted to hold multiple media types which comprises: a media tray adapted to hold media to be fed to an imaging apparatus; a media type identification member provided on the media tray, with the media type identification member including an identifying section which identifies that a first type of media is in the tray; and a movable member provided on the media type identification member. The movable member is movable between a first position in which the identifying section is exposed to indicate that the first type of media is in the tray, and a second position in which the identifying section is blocked by the movable member to indicate that a media type other than the first type of media is in the tray.

The present invention further relates to a method of identifying a media type that is in a media cassette which comprises the steps of: providing a cover on the media cassette that includes an identifying section which identifies that a first type of media is in the cassette; providing a movable member on the cover; and moving the movable member to a first position in which the identifying section is exposed when the first type of media is in the cassette, and to a second position in which the identifying section is blocked by the movable member when a media type other than the first media type is in the cassette.

The present invention further relates to a media cassette adapted to hold multiple media types which comprises a media tray adapted to hold media to be fed to an imaging apparatus; a reflective media type identification section provided on the media tray; and at least one movable plate member which is movable between a first position in which the reflective type identification section is exposed to indicate that a first type of media is in the tray, and at least one second position in which a portion of the reflective type identification section is blocked by the movable member to indicate that a media type other than the first media type is in the tray.

The present invention further relates to a method of identifying a media type that is in a media cassette which comprises the steps of: providing a cover on the media cassette that includes a reflective identifying section; providing a movable plate member on the cover; and moving the movable member to a first position in which the reflective identifying section is exposed when a first type of media is in the cassette, and to at least one second position in which a first portion of the reflective identifying section is blocked by the movable member and a second portion of the reflective identifying section remains exposed when a media type other than the first media type is in the cassette.

The present invention further relates to an imaging apparatus which comprises: a media cassette adapted to hold multiple types of media therein, with the cassette comprising a reflective section; at least first and second sensors, each of the first and second sensors having a light emitter which emits light to the media cassette and a light detector which detects light that is reflected back to the sensor; and a movable member provided on the media cassette. The movable member is movable between a first position in which the reflective section is exposed so as to reflect the light emitted from each of the first and second sensors back to each of the first and second sensors to indicate that a first type of media is in the cassette, and at least one second position in which a first portion of the reflective section is blocked and a second portion of the reflective section is exposed, such that in the at least one second position, one of the first and second sensors which faces the blocked first portion of the reflective section does not receive reflected light, and the other of the first and second sensors which faces the exposed second portion of the reflective section receives reflected light to indicate that a second type of media is in the cassette, such that the first and second sensors are adapted to provide a signal to the imaging apparatus indicative of the type of media in the cassette.

BRIEF DESCRIPTION OF THE DRAWINGS

FIGS. 6A–6D schematically illustrate a further embodiment of the present invention.

DETAILED DESCRIPTION OF THE INVENTION

Figure 1:
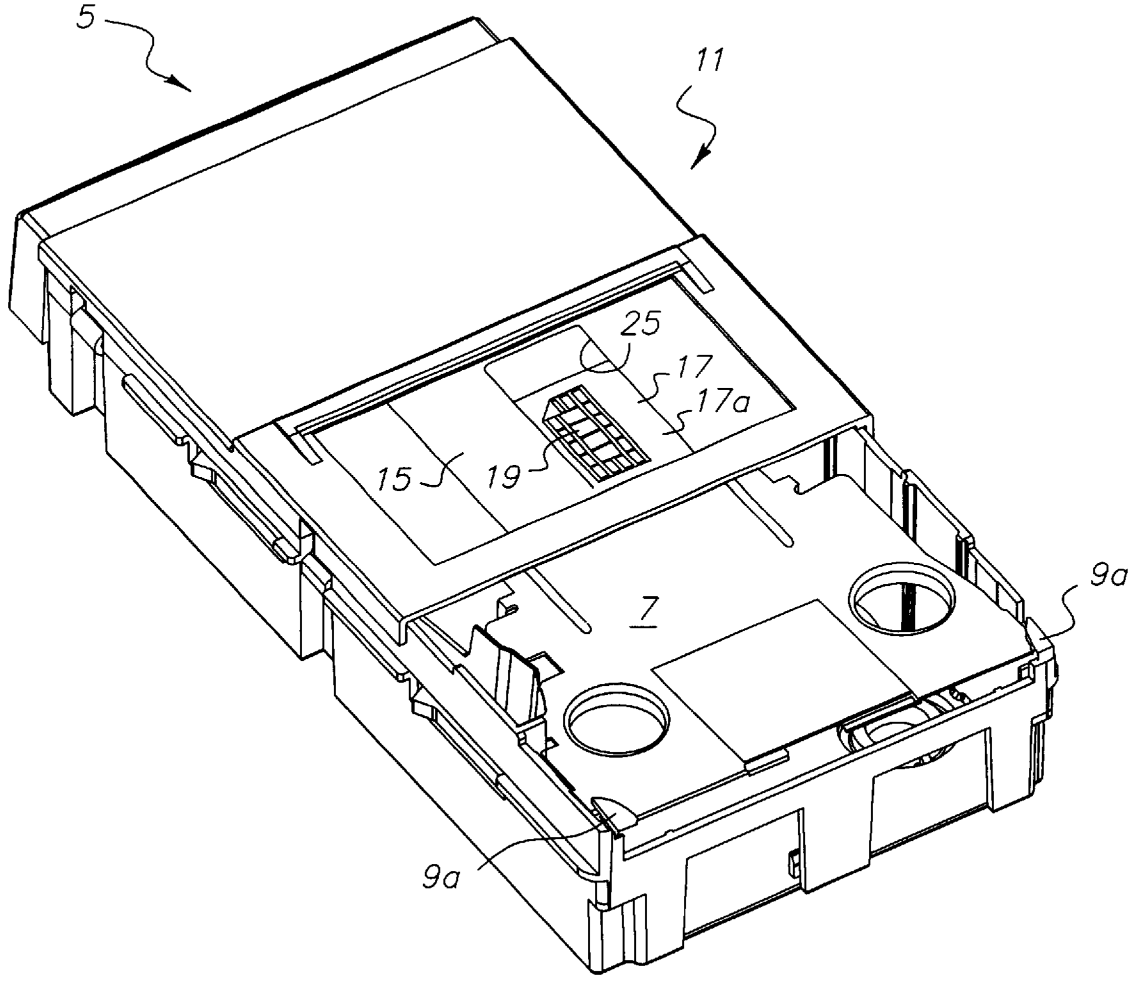
FIG. 1 illustrates a schematic view of a cassette having a media type identification member in accordance with a feature of the present invention, wherein a first type of media is identified.

Referring now to the drawings, wherein like reference numerals represent identical or corresponding parts throughout the several views, FIG. 1 shows a schematic illustration of a media cassette 5 in accordance with the present invention. Media cassette 5 includes a spring-loaded platen 7 as well as corner nails 9*a* for holding media to be fed to an imaging apparatus such as a thermal printer.

In a preferred but non-limiting feature of the present invention, media cassette 5 is adapted to be used in a thermal printer, and is further adapted to hold a first type of media such as photographic paper, and a second type of media such as a sticker prints or paper. Additional types of media in accordance with the user's requirements can also be held in the cassette. Each of these types of media require different operations and/or adjustments by the printer, and accordingly, it is advantageous to provide information to the printer as to the type of media that is in the cassette, so as to adjust and optimize printer operations based on the type of media.

As shown in FIG. 1, media cassette 5 further includes a cover 11 which includes a media type identification section or member 17. Mounted on top of or above media type identification section or member 17 is a movable member 15 such as, for example, a plate like member which can be manually or automatically slid along the widthwise direction of cassette 5. Of course, the present invention is not limited to a widthwise sliding movable member 15 as shown, and the movable member can be moved or rotated in any direction so long as it can be placed in dedicated positions to identify the type of media that is within cassette 5.

Figure 3:
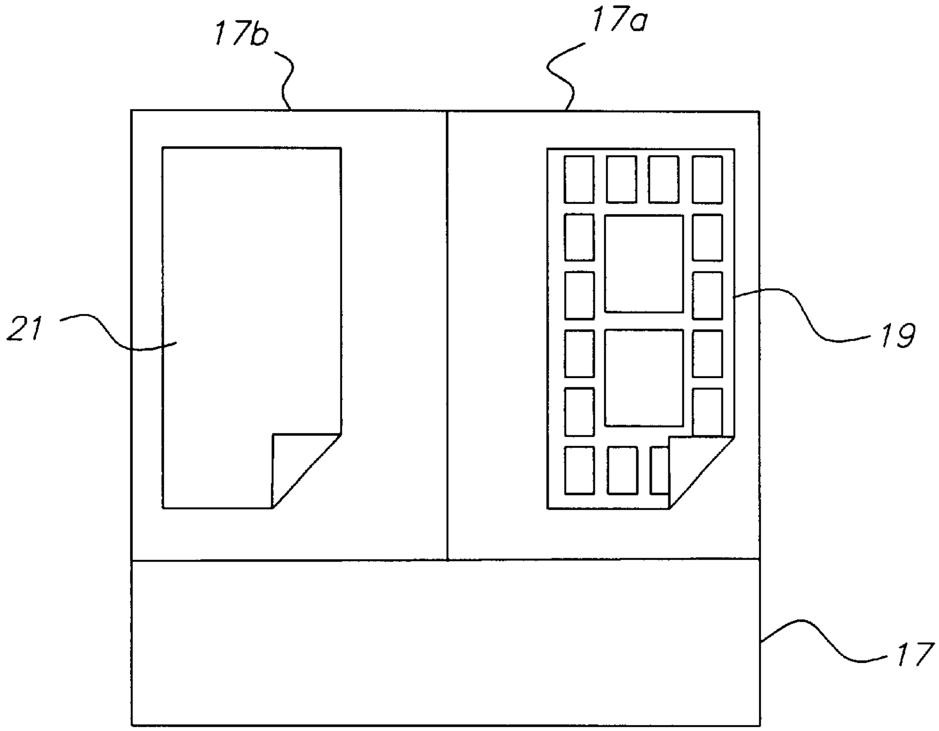
FIG. 3 is in isolated view of the media type identification member.

Referring to FIG. 3, an example of media type identification section 17 is shown. As illustrated in FIG. 3, media type identification section 17 can include a first section 17*a* having a surface, a pattern, a code, a number, an icon, a letter or a word therein which identifies a first type of media. In the example of FIG. 3, the pattern or code in section 17*a* is a graphical illustration 19 representative of sticker prints. Media type identification section 17 further includes a second section 17*b* having a surface, a pattern, a code, a number, an icon, a letter or a word therein which identifies a second type of media. In the example of FIG. 3, second section 17*b* includes a graphical illustration 21 representative of photographic paper. Of course, graphical illustrations 19 and 21 are shown for descriptive purposes only, and any type of background, pattern, code, letter, number, etc. can be utilized to identify the specific type of media.

In a preferred feature of the present invention, one of the sections 17*a*, 17*b* and specifically, one of the graphical illustrations 19, 21 is a reflective label or defines a reflective surface. Thus, for example, graphical illustration 19 can be in the form of an integrated reflective surface or a reflective label. Further, graphical illustration 21 can be an integrated non-reflective surface or a non-reflective label.

Referring back to FIG. 1, movable member 15 is designed to have an opening 25 which is sized so as to expose either of sections 17*a*, 17*b* and specifically, to expose graphical illustrations 19 and 21, depending on the position of movable member 15.

Therefore, during use of media tray 5, media of a specific type is loaded into tray 5. For example, and referring to FIGS. 1 and 4A, if photo stickers are loaded into tray 5, then a user slides movable member 15 to a position in which opening 25 exposes first section 17*a* and specifically exposes graphical illustration 19 (see FIGS. 1 and 4A). This provides a visual indication that a first type of media is in tray 5, and as will be described later, is utilized to provide a signal to an imaging apparatus that imaging is to be performed on a first type of media and specifically, photo sticker paper.

Figure 4A:
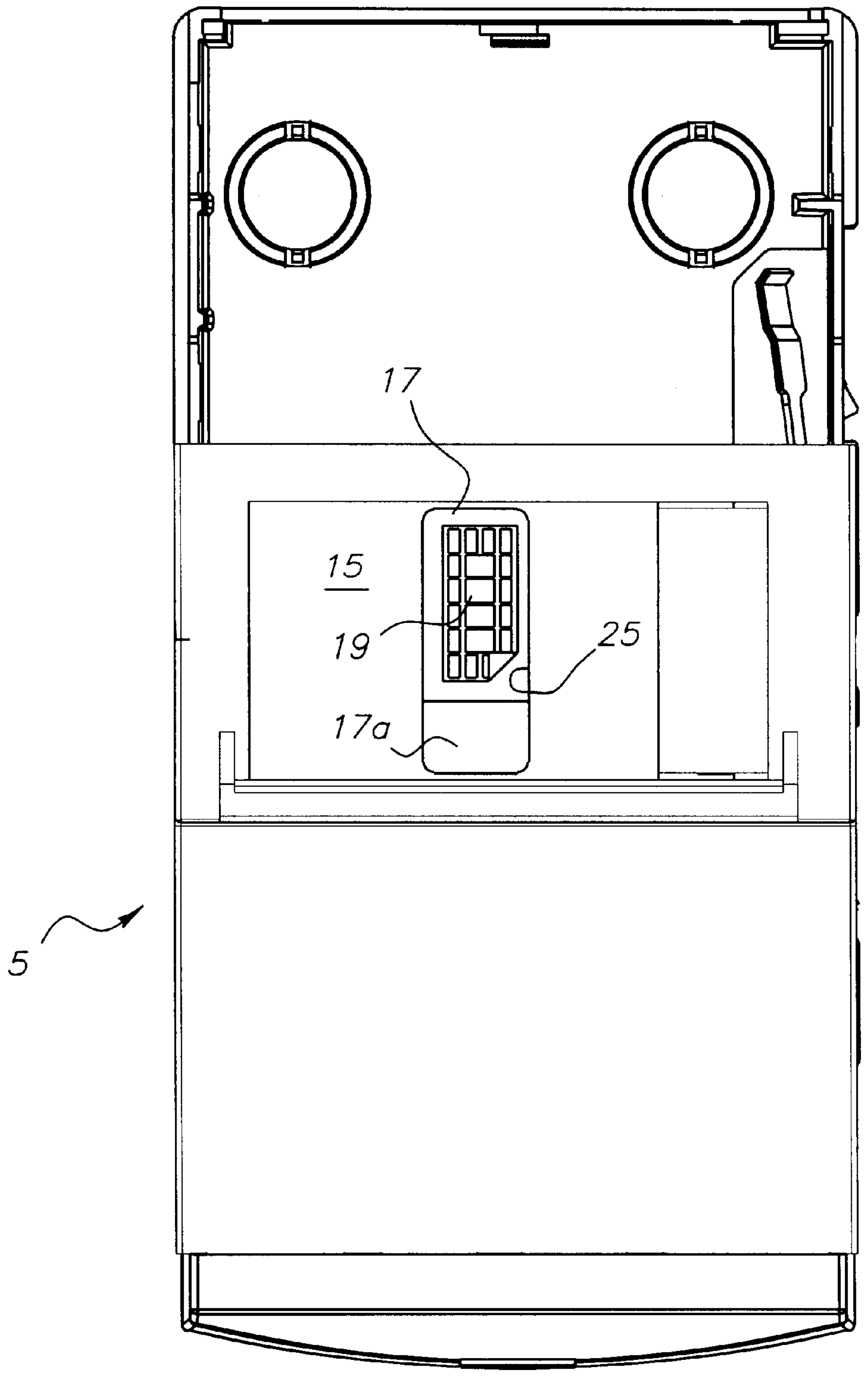
FIGS. 4A–4C are views of the cassette of FIG. 1 showing an operation of the media type identification member.
Figure 4B:
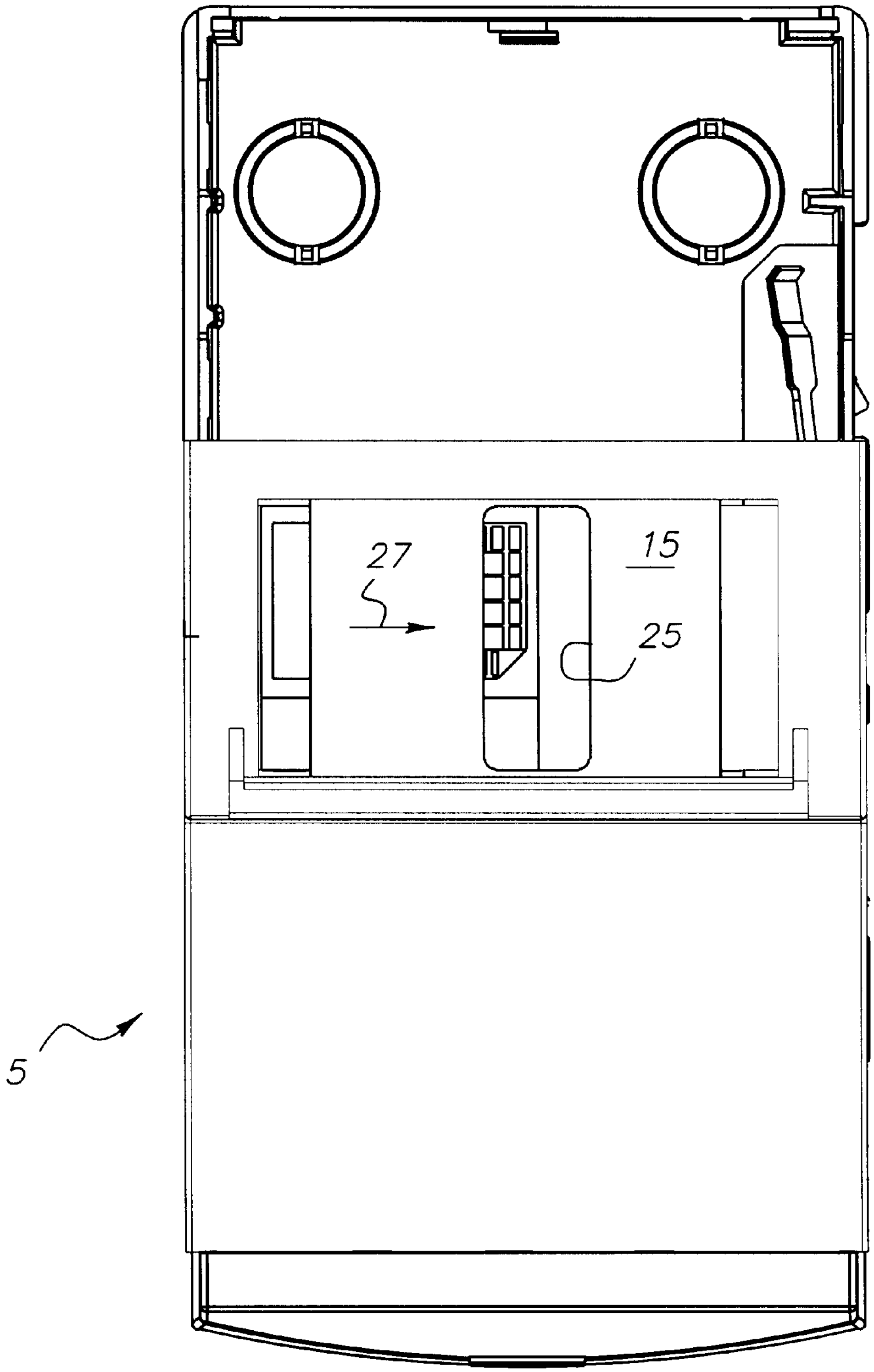
Figure 4C:
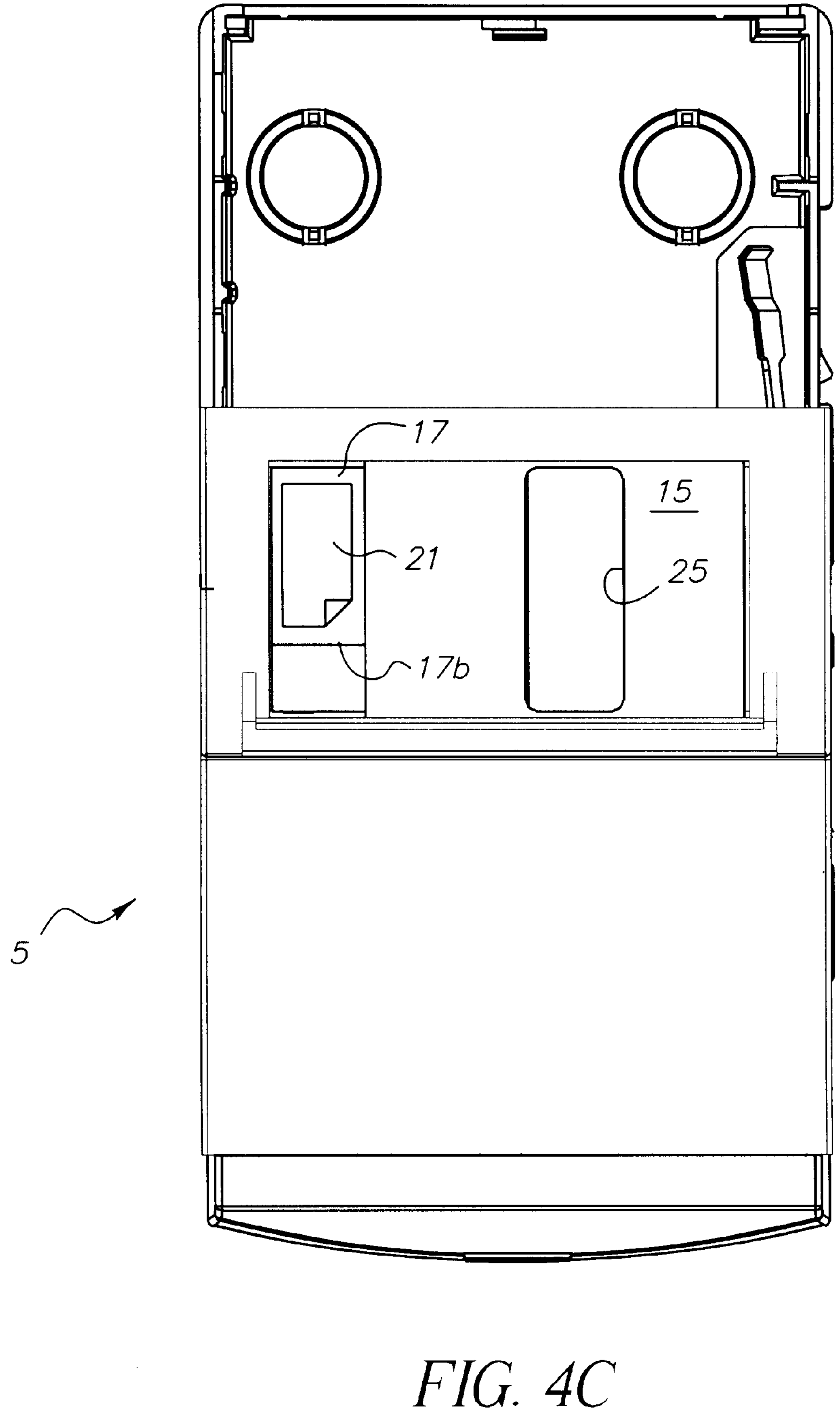

When it is desired to print on a second type of media such as, for example, photographic paper, the photographic paper is loaded into cassette 5, and the slidable member is moved in the direction as shown by the arrow 27 in FIG. 4B. This blocks graphical illustration 19 and permits graphical illustration 21 representative of photographic paper to be visible since movable member 15 is no longer blocking graphical illustration 21 (see FIGS. 2 and 4C). This provides a visual indication to a user that photographic paper is loaded in media cassette 5, and in a manner which will be described later, provides a communication to the imaging apparatus or printer that imaging or printing is to be performed on photographic paper. Therefore, as illustrated in FIGS. 4A–4C, movable member 15 is moved from the position shown in FIG. 4A which gives a visual indication that photo sticker papers are positioned in cassette 5, to the position shown in FIG. 4C which gives a visual indication that photographic paper is in cassette 5.

Figure 5:
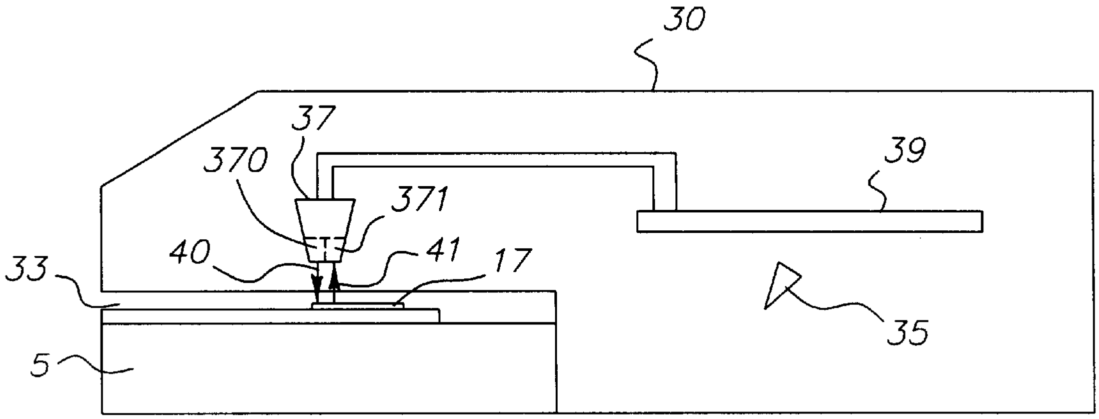
FIG. 5 is an example of an imaging apparatus having a media cassette in accordance with the present invention.

With reference to FIG. 5, an imaging apparatus 30 such as for example, a thermal printer is shown. Within the context of the present invention, imaging apparatus 30 includes an opening 33 for receiving removable cassette 5. Imaging apparatus can be a well known imager such as for example, a thermal printer or any other type of printer or scanner. Imaging apparatus 30 includes an imaging apparatus control assembly 35 which comprises a printer media type sensor 37 and a controller 39. Printer media type sensor 37 preferably comprises a light emitter 370 which emits light 40 in the direction shown, and a light detector 371 which is adapted to detect light 41 which is reflected back in the direction shown to sensor 37. Sensor 37 is preferably designed to scan the entire width of media type identification section 17. Controller 39 is preferably a printer logic board which is operationally associated with printer media type sensor 37 and receives a signal from media type sensor 37 indicative of whether light is being detected by light detector 371 of printer media type sensor 37, or is not being detected.

In a preferred feature of the present invention as shown in FIGS. 6A–6D, rather than having a single sensor 37, you could have at least two sensors 37*a* and 37*b*. Each of sensors 37*a*, 37*b* would be emitting/detecting type sensors as shown in FIG. 5. and would be arranged in a side-by-side manner.

Therefore, during use of imaging apparatus 30 and using the single sensor of FIG. 5, a user first loads cassette 5 either with a first type of media or a second type of media. Assuming that a user will be printing on sticker prints and has loaded sticker paper into media cassette 5, the user will slide movable member 15 so that graphical illustration 19 will be exposed via opening 25 (FIGS. 1 and 4A). In a preferred embodiment, graphical illustration 19 will be a reflective surface or comprise a reflective label which is exposed or viewable via opening 25. In a still further preferred example, graphical illustration 19 will be a graphical illustration of a sticker print. When loaded into imaging apparatus 30 as illustrated into FIG. 5, graphical illustration 19 which is a reflective surface or which includes a reflective label will face printer media type sensor 37; such that light 40 emitted from light emitter 370 will be reflected by the reflective surface or reflective label of graphical illustration 19 in the direction 41 back to printer media type sensor 37, where it will be detected by light detector 371. Thereafter, printer media type sensor 37 will provide a signal to controller 39 that reflected light has been detected and that a first type of media, and specifically, a photo sticker paper is loaded in media cassette 5. Based on this information, controller 39 will control and/or optimize the imaging and/or printing which is to be performed by imaging apparatus 30 in accordance with photo sticker paper. More specifically, controller 39 will control imaging apparatus 30 to make adjustments and/or compensations for printing and/or imaging on photo sticker paper. Cassette 5 can also include a further sensor (not shown) which informs imaging apparatus 30 that cassette 5 is present in imaging apparatus 30.

Figure 2:
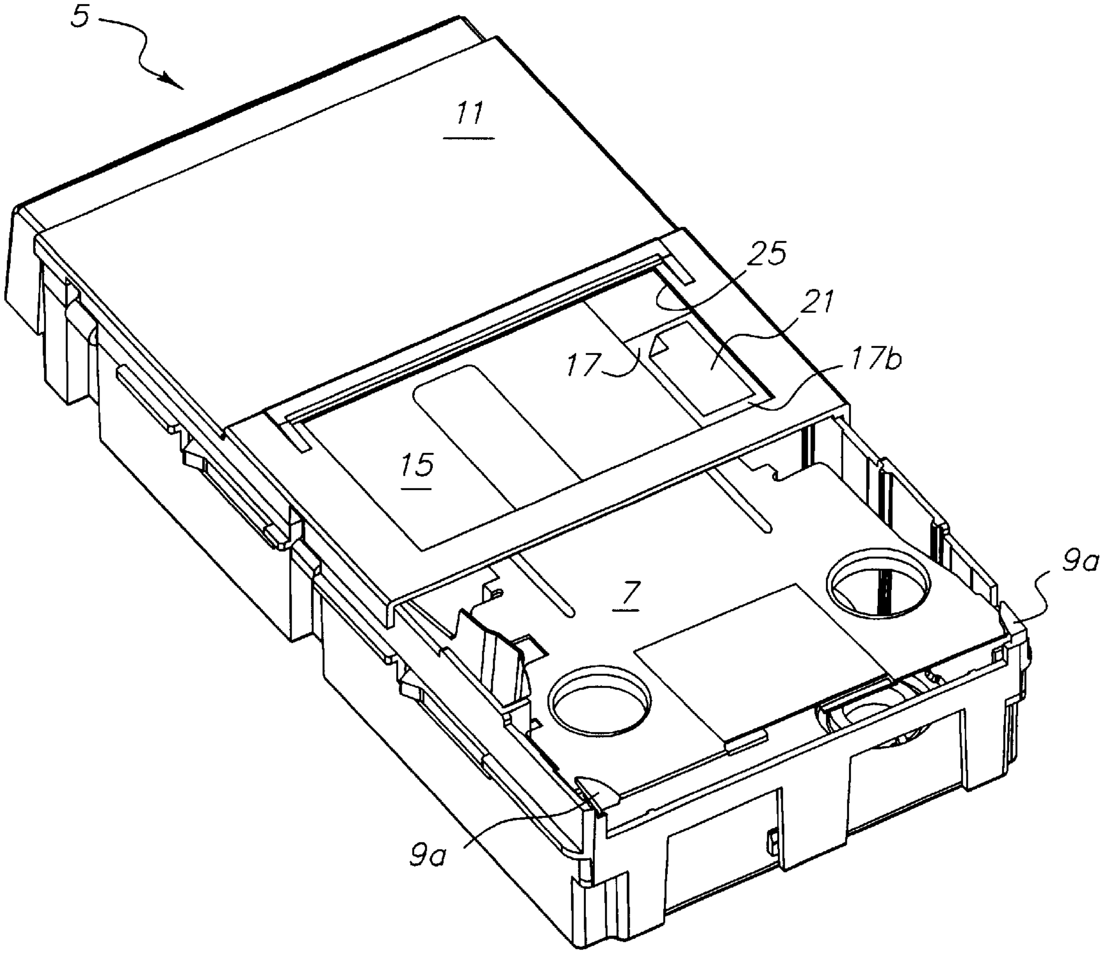
FIG. 2 is a schematic view of the cassette of FIG. 1 in which the media type identification member identifies a second type of media in the cassette.

If a user loads paper other than the first type of paper, for example, if a user loads photographic paper into cassette 5, the movable member 15 will be moved in direction 27 as shown in FIG. 4B, so as to move from the position illustrated in FIG. 4A to the position illustrated in FIGS. 2 and 4C. At this point, photographic paper graphical illustration 21 is exposed or viewable while graphical illustration 19 is blocked. In a preferred feature of the present invention, graphical illustration 21 defines a non-reflective surface or non-reflective label. When loaded into imaging apparatus 30 as illustrated in FIG. 5, light 40 emitted from light emitter 370 of printer media type sensor 37 will not be reflected back to light detector 371. Therefore, no signal will be provided to controller 39 or a signal indicating that no light is being detected by printer media sensor 37 will be provided to controller 39. At this point, controller 39 will control imaging apparatus 30 in accordance with the fact that a second type of media and more specifically, photographic paper is loaded into cassette 5. Thus, controller 39 will control and/or adjust the imaging apparatus 30 in accordance with the requirements of photographic paper.

Therefore, in the description noted above, a cassette having, for example, a reflective label enables printer media type sensor 37 to detect an emitted signal reflected back to sensor 37 indicating that a first type of media is in the cassette, to permit a control of the printing or imaging process in accordance with the requirements of the first type of media. If printer media type sensor 37 does not detect an emitted signal reflected back to sensor 37, this indicates that a second type of media is in the cassette and thus printing or imaging is controlled in accordance with the requirements of the second type of media. In a preferred feature, the emitted signal is allowed to be reflected back to media type sensor 37 by the use of a reflective surface or label. Also, the emitted signal is not allowed to be reflected back to the media type sensor 39 by the use of movable member 15 which can be positioned to cover the reflective surface or label. In a further preferred feature of the invention, movable member 15 has an opening or window 25 as noted above, which permits a user to see a first pattern, diagram or graphical illustration representing a first media type; and when moved, movable member 15 can be positioned such that the first pattern is blocked, and a second pattern, graphical illustration or diagram is shown representing a second type of media. The printer electronics detects which media type was selected by the user based on the position of the movable member and whether reflected light is detected, and adjusts for the media type before printing.

The present invention has been described with reference to utilizing a movable member 15 having an opening 25 which in a first position, exposes a first graphical illustration through opening 25 and blocks a second graphical illustration; and in a second position blocks the first graphical illustration while exposing the second graphical illustration. The present invention is not limited to utilizing two graphical illustrations to show two different types of papers. It is recognized that the media type identification section can simply include a single reflective pattern, surface or illustration to identify a first type of paper, and that movable member 15 can simply be a plate 15*a*, 15*b* without an opening as shown in FIGS. 6A–6D. In one feature of this embodiment, the printer would be controlled simply on the basis of the sensor seeing or not seeing the reflective pattern or surface. More specifically, when the plate does not cover the reflective pattern, the printer knows that imaging is to be performed on a first type of media based on the detection of reflected light, and when the plate covers the reflective pattern, the printer does not see the reflective pattern, and would therefore know that a second type of media is in the cassette based on not detecting reflected light. In this embodiment, media type identification section 17 as shown in FIG. 3 would only include a single pattern which identifies a first type of paper, and a second type of paper would basically be identified by the first pattern being blocked.

In a still further feature of the invention, rather than using reflective versus non-reflective patterns or illustrations to adjust printer operation, media type identification section 17 could include an infrared dye or some other readable code that can be read or scanned by a reader in the printer. In this embodiment, when the code is exposed to the reader through opening 25, printer adjustments would be based on a first type of media, and when the code is blocked, printer adjustments would be based on a second type of media.

With reference to FIGS. 6A–6D, the feature of the invention where at least two sensors 37*a* and 37*b* are used will be described. In a preferred feature of the invention as shown in FIGS. 6A–6D, the identification of multiple media types is based on a sensing scheme. More specifically, in the embodiment of FIGS. 6A–6D, movable member 15 would be in the form of at least one movable or sliding plate member 15*a*, and optionally a second movable or sliding plate member 15*b* which is movable independent of plate member 15*a* can be included. Further, media type identification section 17 would be in the form of a single reflective label, patch and/or surface 100.

The invention of FIGS. 6A–6D would operate as follows. First, when a first type of media is in cassette 5, a first sensing scheme as shown in FIG. 6A would be used to identify the first type of media. Therefore, to identify the first type of media, a user would position plate 15*a* and plate 15*b* if included in the position shown in FIG. 6A, to expose the entire reflective label, patch and/or surface 100 to both sensors 37*a* and 37*b*. In the position of FIG. 6A, each of sensors 37*a*, 37*b* which emit light onto reflective label, patch and/or surface 100 would each detect reflected light. This defines a reflective/reflective sensing scheme which indicates one type of media. This information would therefore be communicated to imaging apparatus 30 in the same manner as discussed with reference to FIG. 5 to inform imaging apparatus 30 that imaging will be performed on a first type of media, and imaging or printing can be adjusted appropriately.

FIG. 6B identifies a second type of sensing scheme which is used to identify a second type of media. More specifically, as shown in FIG. 6B, when a second type of media is in cassette 5, a user moves plate 15*a* as shown to block the portion of reflective label, patch and/or surface 100 which faces sensor 37*b*. Therefore in FIG. 6B, sensor 37*a* will receive reflected light while sensor 37*b* will not receive reflected light. This sends a signal to imaging apparatus 30 as discussed with reference to FIG. 5, indicating that sensor 37*a* has emitted and detected light and that sensor 37*b* does not detect light. This information is communicated to imaging apparatus 30 and imaging or printing can be appropriately adjusted based on the type of detected media. This defines a reflective/non-reflective sensing scheme.

FIG. 6C identifies a third type of sensing scheme which is used to identify a third type of media. That is, when a third type of media is in cassette 5, a user moves plate 15*a* to the position shown in FIG. 6C to block the portion of reflective label, patch and/or surface 100 which faces sensor 37*a*. This sends a signal to imaging apparatus 30 as discussed with reference to FIG. 5 indicating that sensor 37*a* does not detect light and sensor 37*b* emits and detects light. This information is communicated to imaging apparatus 30 and imaging or printing can be appropriately adjusted based on the type of media. This defines a non-reflective/reflective sensing scheme.

FIG. 6D identifies a fourth type of sensing scheme that can be used to identify a fourth type of media. That is, when a fourth type of media is in cassette 5, a user moves plate 15*a* to block the portion of reflective label, patch and/or surface 100 which faces sensor 37*a*, and moves plate 15*b* to block the portion of reflective label, patch and/or surface 100 which faces sensor 37*b*. This sends a signal to imaging apparatus 30 indicating that both sensors 37*a* and 37*b* emit but do not detect light in order to inform imaging apparatus 30 that imaging or printing will be performed on a fourth type of media. Imaging can accordingly be appropriately adjusted based on the detected type of media. This defines a non-reflective/non-reflective sensing scheme.

Of course, it is recognized that the present invention is not limited to the sensing schemes shown in FIGS. 6A–6D, and that any variation or combination of sensing schemes can be used in the present invention provided that they provide unique signals to the imaging apparatus. It is further noted that additional sensors could be used to provide for different combination of sensing schemes. Further, detents or some other kind of holding means can be used to maintain plates 15*a* and 15*b* in the positions shown in FIGS. 6A–6D. Additionally, it is recognized that in the embodiment as shown in FIGS. 6A–6D, the cassette could include a separate sensor to signal the presence of the cassette in the imaging apparatus. However, in a preferred feature of the invention, one of the sensing schemes shown in FIGS. 6A–6D, for example, the sensing scheme of FIG. 6D, could be used to signal the presence of the cassette in the imaging apparatus.

Additionally, the present invention is not limited to a widthwise movable member 15, 15*a*, 15*b* as shown, and it is recognized that the movable member can be moved and/or rotated in any direction so long as the desired graphical pattern or illustration is shown.

Therefore, the present invention provides for a system and method for sensing multiple media types that permits the use of a single media cassette. The arrangement of the present invention uses a media type sensor within an imaging apparatus in combination with a media type identification section on a cassette. The cassette preferably includes a reflective surface or label that identifies a first type of media. A movable member or plate that is movable and/or slidable, is used to expose or block the reflective label to provide a signal to the imaging apparatus indicative of the type of paper that is loaded in the cassette. Based on this signal, printer electronics are adjusted.

The invention has been described in detail with particular reference to certain preferred embodiments thereof, but it will be understood that variations and modifications can be effected within the spirit and scope of the invention.

What is claimed is:

1. A media cassette adapted to hold multiple media types, the cassette comprising:

a media tray adapted to hold media to be fed to an imaging apparatus;

a media type identification member provided on said media tray, said media type identification member including a first section which identifies to a user that a first type of media is in said tray and is adapted to communicate that said first type of media is in said tray to an imaging apparatus, and a second section independent of said first section which identifies to a user that a second type of media is in said tray and is adapted to communicate that said second type of media is in said tray to an imaging apparatus; and a movable member provided on said media type identification member, said movable member having an opening and being movable between a first position in which said opening is aligned with said first section to identify that the first type of media is in said tray, and a second position in which said opening is aligned with said second section to identify that the second type of media is in said tray.

2. A media cassette according to claim 1, wherein said movable member is manually slidable between the first position and the second position.

3. A media cassette according to claim 1, wherein said first section comprises a first pattern to identify the first type of media, and said second section comprises a second pattern to identify the second type of media.

4. A media cassette adapted to hold multiple media types, the cassette comprising:

a media tray adapted to hold media to be fed to an imaging apparatus;

a media type identification member provided on said media tray, said media type identification member including a first section which identifies that a first type of media is in said tray and is adapted to communicate that said first type of media is in said tray to an imaging apparatus, and a second section which identifies that a second type of media is in said tray and is adapted to communicate that said second type of media is in said tray to an imaging apparatus; and a movable member provided on said media type identification member, said movable member having an opening and being movable between a first position in which said opening is aligned with said first section to identify that the first type of media is in said tray, and a second position in which said opening is aligned with said second section to identify that the second type of media is in said tray;

wherein said first section comprises a reflective surface or label that identifies the first type of media, and said second section comprises a non-reflective surface or label which identifies the second type of media.

5. A media cassette adapted to hold multiple media types, the cassette comprising:

a media tray adapted to hold media to be fed to an imaging apparatus;

a media type identification member provided on said media tray, said media type identification member including a first section which identifies that a first type of media is in said tray and is adapted to communicate that said first type of media is in said tray to an imaging apparatus, and a second section which identifies that a second type of media is in said tray and is adapted to communicate that said second type of media is in said tray to an imaging apparatus; and a movable member provided on said media type identification member, said movable member having an opening and being movable between a first position in which said opening is aligned with said first section to identify that the first type of media is in said tray, and a second position in which said opening is aligned with said second section to identify that the second type of media is in said tray;

wherein said first section comprises a reflective graphical illustration which identifies the first type of media, and said second section comprises a non-reflective graphical illustration which identifies the second type of media.

6. A media cassette adapted to hold multiple media types, the cassette comprising:

a media tray adapted to hold media to be fed to an imaging apparatus;

a media type identification member provided on said media tray, said media type identification member including a first section which identifies that a first type of media is in said tray and is adapted to communicate that said first type of media is in said tray to an imaging apparatus, and a second section which identifies that a second type of media is in said tray and is adapted to communicate that said second type of media is in said tray to an imaging apparatus; and a movable member provided on said media type identification member, said movable member having an opening and being movable between a first position in which said opening is aligned with said first section to identify that the first type of media is in said tray, and a second position in which said opening is aligned with said second section to identify that the second type of media is in said tray;

wherein said first section comprises a reflective pattern which identifies the first type of media, and said second section comprises a non-reflective pattern which identifies the second type of media.

7. A media cassette adapted to hold multiple media types to be fed to an imaging apparatus, the media cassette comprising:

a cover provided on said cassette, said cover comprising a first section that is adapted to identify to a user that a first media type is in said cassette, and a second section independent of said first section that is adapted to identify to a user that a media type other than said first media type is in said cassette; and a movable member movably provided on said cover and having an opening, said movable member being movable between a first position in which said opening exposes said first section to indicate that imaging will be performed on the first type of media, and a second position which blocks said first section to indicate that imaging will be performed on the media type other than said first media type, wherein said first and second sections are further adapted to communicate with an imaging apparatus based on the position of the movable member.

8. A media cassette according to claim 7, wherein said first section is a reflective surface or label that identifies the first media type.

9. A media cassette according to claim 7, wherein said movable member is slidable between the first position and the second position.

10. A media cassette according to claim 7, wherein said first section comprises a pattern which identifies the first media type.

11. A media cassette according to claim 7, wherein said first section comprises a reflective graphical illustration which identifies the first media type.

12. An imaging arrangement comprising:

a removable media cassette which is adapted to hold multiple media types for imaging in the imaging apparatus, said media cassette comprising a cover having a reflective section to indicate that a first type of media is in said cassette, said media cassette further comprising a movable member provided on said cover and having an opening, said movable member being movable between a first position in which said opening is aligned with said reflective section to indicate that a first type of media is in said media cassette, and a second position in which said opening is not aligned with said reflective section to indicate that a second type of media is in said cassette;

a media type sensor comprising a light emitter and light detector, said light detector detecting emitted light from said light emitter which reflects back from the reflective section of said cover when said movable member is in said first position and provides a first signal indicative thereof; and an imaging arrangement controller operationally associated with said media type sensor, said imaging arrangement controller receiving the first signal from said media type sensor when the movable member is in said first position to adjust an operation of said imaging arrangement based on the first type of media in said cassette, and receiving a further signal from said media type sensor when said movable member is in said second position to adjust an operation of said imaging arrangement based on the second type of media in said cassette.

13. An imaging apparatus comprising:

a media cassette adapted to hold multiple types of media therein, said cassette comprising a reflective section which identifies a media type that is in said cassette;

a sensor having a light emitter which emits light to said media cassette and a light detector which detects light which is reflected back to said sensor; and a movable member provided on said media cassette, said movable member being movable between a first position in which said reflective section is exposed so as to reflect the light emitted from said light emitter back to said light detector to indicate that a first type of media is in said cassette, and a second position in which said reflective section is blocked so that no light is reflected back to said light detector to indicate that a second type of media is in said cassette, such that said sensor is adapted to provide a signal to said imaging apparatus indicative of the type of media in said cassette.

14. An imaging apparatus according to claim 13, wherein said reflective section is a reflective surface or label provided on a cover of said cassette.

15. A method of identifying a media type that is in a media cassette, the method comprising the steps of:

providing a cover on the media cassette that includes a first section which identifies to a user that a first type of media is in said cassette, and a second section independent of said first section that identifies to a user that a second type of media is in said cassette;

providing a movable member having an opening on said cover; and moving said movable member to a first position in which the opening is aligned with the first section when the first type of media is in said cassette, and to a second position in which the opening is not aligned with said first section when the second type of media is in said cassette, said first and second sections being adapted to communicate with an imaging apparatus based on the position of the movable member.

16. A method according to claim 15, wherein the opening is aligned with the second section when the movable member is in said second position.

17. A method according to claim 15, wherein said first section comprises a reflective pattern and said second section comprises a non-reflective pattern.

18. A method of indicating a type of media and communicating the type of media to an imaging apparatus, the method comprising the steps of:

providing a cover having a reflective surface thereon on a media cassette;

providing a movable member having an opening on the cover;

moving said movable member to one of a first position in which the opening is aligned with the reflective surface when a first type of media is in said cassette, and a second position in which the opening is not aligned with the reflective surface when a second type of media is in said cassette;

inserting the media cassette having media therein into said imaging apparatus; and emitting a light toward said media cassette, such that when the first type of media is in said cassette, said movable member is placed in said first position to cause said emitted light to be reflected from said reflective surface back to a light detector operationally associated with said imaging apparatus to indicate to said imaging apparatus that the first type of media is in said cassette, and when the second type of media is in said cassette, said movable member is placed in said second position to block said reflective surface from the emitted light and prevent reflected light from going back to said light detector to indicate to said imaging apparatus that the second type of media is in said cassette.

19. A method according to claim 18, comprising the further step of:

adjusting an operation of said imaging apparatus in accordance with the type of media in said cassette.

20. A method of identifying a media type that is in a media cassette, the method comprising the steps of:

providing a cover on the media cassette that includes a reflective identifying section;

providing a movable plate member on said cover;

moving said movable member to a first position in which the reflective identifying section is exposed when a first type of media is in said cassette, and to at least one second position in which a first portion of the reflective identifying section is blocked by the movable member and a second portion of said reflective identifying section remains exposed when a media type other than said first media type is in said cassette;

inserting the media cassette having media therein into an imaging apparatus; and emitting a light toward said media cassette, such that when the first type of media is in said cassette, said movable member is placed in said first position to cause said emitted light to be reflected from said reflective identifying section to first and second sensors operationally associated with the imaging apparatus to indicate to said imaging apparatus that the first type of media is in said cassette, and when the other type of media is in said cassette, said movable member is placed in said at least one second position to prevent one of said first and second sensors which faces the blocked first portion of said reflective identifying section from receiving reflected light and permit the other of said first and second sensors which faces the exposed second portion of the reflective identifying section to receive reflected light, to indicate to said imaging apparatus that the other type of media is in said cassette.

21. A method according to claim 20, comprising the further step of:

adjusting an operation of said imaging apparatus in accordance with the type of media in said cassette.

22. An imaging apparatus comprising:

a media cassette adapted to hold multiple types of media therein, said cassette comprising a reflective section;

at least first and second sensors, each of said first and second sensors having a light emitter which emits light to said media cassette and a light detector which detects light that is reflected back to said sensor; and a movable member provided on said media cassette, said movable member being movable between a first position in which said reflective section is exposed so as to reflect the light emitted from each of said first and second sensors back to each of said first and second sensors to indicate that a first type of media is in said cassette, and at least one second position in which a first portion of said reflective section is blocked and a second portion of said reflective section is exposed, such that in said at least one second position, one of said first and second sensors which faces the blocked first portion of said reflective section does not receive reflected light, and the other of said first and second sensors which faces the exposed second portion of said reflective section receives reflected light to indicate that a second type of media is in said cassette, such that said first and second sensors are adapted to provide a signal to said imaging apparatus indicative of the type of media in said cassette.

* * * * *